US008592757B2

(12) United States Patent
Schwieters et al.

(10) Patent No.: US 8,592,757 B2

(45) Date of Patent: Nov. 26, 2013

(54) MASS SPECTROMETER AND METHOD FOR ISOTOPE ANALYSIS

(75) Inventors: Johannes Schwieters, Ganderkesee (DE); Silke Seedorf, Weyhe (DE); Michael Deerberg, Delmenhorst (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 13/377,807

(22) PCT Filed: Jun. 10, 2010

(86) PCT No.: PCT/EP2010/003491

§ 371 (c)(1),
(2), (4) Date: Dec. 12, 2011

(87) PCT Pub. No.: WO2010/145776

PCT Pub. Date: Dec. 23, 2010

(65) Prior Publication Data

US 2012/0085904 A1 Apr. 12, 2012

(30) Foreign Application Priority Data

Jun. 19, 2009 (DE) ......................... 10 2009 029 899

(51) Int. Cl.
*B01D 59/44* (2006.01)

(52) U.S. Cl.
USPC ........... 250/283; 250/281; 250/282; 250/294; 250/296; 250/298

(58) Field of Classification Search
USPC ................................................ 250/281–300
See application file for complete search history.

(56) References Cited

U.S. PATENT DOCUMENTS 4,099,052 A * 7/1978 McKinney .................... 250/283
4,524,275 A * 6/1985 Cottrell et al. ................ 250/298
4,649,314 A * 3/1987 Eschard ................. 313/103 CM
4,771,171 A * 9/1988 Snyder et al. ................ 250/281
5,043,575 A * 8/1991 Habfast et al. ................ 250/283
5,166,518 A * 11/1992 Freedman ..................... 250/296

(Continued)

FOREIGN PATENT DOCUMENTS

DE 3905631 A1 8/1990
DE 4002849 A1 8/1991

(Continued)

*Primary Examiner* — Michael Logie

(74) *Attorney, Agent, or Firm* — Laurence P. Colton; Smith Risley Tempel Santos LLC

(57) ABSTRACT

A mass spectrometer for analyzing isotopic signatures, with at least one magnetic analyzer and optionally with an electric analyzer as well, with a first arrangement of ion detectors and/or ion passages and, arranged downstream thereof in the direction of the ion beam, a second arrangement of ion detectors, with at least one deflector in the region of the two arrangements of ion detectors or between these arrangements. Additionally, a multi-collector arrangement, special uses and a method for analyzing isotopes in a sample. The mass spectrometer according to the invention has a control for the at least one deflector such that ion beams of different isotopes can be routed to at least one ion detector in the second arrangement.

44 Claims, 4 Drawing Sheets

(56) References Cited

U.S. PATENT DOCUMENTS

| | | | | | |
|---|---|---|---|---|---|
| 5,471,059 | A | * | 11/1995 | Freedman et al. | 250/299 |
| 5,545,894 | A | * | 8/1996 | Funsten et al. | 250/281 |
| 6,297,501 | B1 | * | 10/2001 | Merren | 250/296 |
| 6,984,821 | B1 | * | 1/2006 | Appelhans et al. | 250/294 |
| 7,294,954 | B2 | * | 11/2007 | Syms | 313/103 CM |
| 7,439,498 | B2 | * | 10/2008 | Litherland et al. | 250/288 |
| 2004/0262533 | A1 | * | 12/2004 | Krueger | 250/397 |
| 2009/0114809 | A1 | * | 5/2009 | Hotchkis et al. | 250/282 |

FOREIGN PATENT DOCUMENTS

| | | | |
|---|---|---|---|
| DE | 69118492 | T2 | 8/1996 |
| DE | 69315513 | T2 | 11/1998 |
| DE | 102007026441 | A1 | 12/2007 |
| EP | 0490626 | A2 | 6/1992 |
| EP | 0952607 | A2 | 10/1999 |
| EP | 1339089 | B1 | 8/2003 |
| WO | 2007025348 | A1 | 3/2007 |

* cited by examiner

MASS SPECTROMETER AND METHOD FOR ISOTOPE ANALYSIS

BACKGROUND OF THE INVENTION

1. Technical Field

The invention relates to a mass spectrometer for analyzing isotopic signatures, with at least one magnetic analyzer and optionally with an electric analyzer as well, with a first arrangement of ion detectors and/or ion passages and, arranged downstream thereof in the direction of the ion beam, a second arrangement of ion detectors, with at least one deflector in the region of the two arrangements of ion detectors or between these arrangements. Additionally, the invention relates to a method for analyzing isotopes in a sample.

2. Prior Art

Preferred fields of application of the invention are geochronology and the control and regulation of nuclear processes.

The drive behind the invention is the desire for a measurement system that is as universal as possible.

Different elements, each with a plurality of isotopes, are of interest, particularly in the various methods found in geochronology.

By way of example, determining age using the mineral zircon is of importance, using both the so-called "uranium-lead method" and the "lutetium-hafnium method". The details of these methods are of secondary importance to the invention. What is essential is that—this is usual in the case of a large background of the main constituents in the initial stone (the isotopes relevant to the uranium-lead method at best constitute a few percent, typically even only a few ppm, of the overall material)—the ratios of a plurality of isotopes have to be measured, e.g. $^{204}Pb$, $^{206}Pb$, $^{207}Pb$, $^{235}U$, $^{238}U$, and optionally further masses/isotopes in order to be sure of and correct the results. The same stone can also be dated using the Lu/Hf method, with the components being significantly more abundant in this case; in zircons $HfO_2$ constitutes up to 30% (5% is typical), $ThO_2$ up to 12%, $U_3O_8$ up to 1.5%.

The in part very different intensities must be measured using different detector types: Faraday collectors for high ion flows, Channeltron and secondary electron multipliers (SEM) for low and very low ones. Moreover, it may be necessary to introduce an energy barrier in order to remove the background of adjacent mass numbers (page 9 of the Triton/Neptune brochure by the applicant).

A further application is the measurement of (enriched) uranium, where mass numbers of 233, 234, 235, 236 and 238 are observed. Here $^{238}U$ is the dominant isotope. In natural uranium, the isotope 235 is present in an abundance of approximately 0.7% and the isotope 234 is present in an abundance of approximately 5 ppm.

The measurements are typically carried out using (double focusing) multi-collector mass spectrometers in which different measurement channels are associated with the different isotopes. The type of measurement channel in this case depends on the (expected) intensity and the intensity of the neighboring channels.

In order to be able to carry out different types of measurements, multi-collector systems can either have moveable collectors (TFS Neptune or TFS Triton) or the mass-dependent spacing between the isotopes can be compensated for by an ion-optical element.

In a typical (prior art) design, moveable elements carrying Faraday and/or Channeltron detectors are kept available for universal use, as is a special channel with an ion counter (secondary electron multiplier) and a Faraday detector, with switching being possible between counting and Faraday operation. In this channel, there additionally is an energy barrier (RPQ) available in front of the counting detector.

Additionally, separate counting detectors (Channeltrons) can optionally be kept available, e.g. for measuring uranium, in particular for relatively high masses, where very small distances are required between the detectors for adjacent mass numbers.

Thermal ionization or inductively coupled plasma (ICP) can serve for ionization, e.g. after a preceding laser ablation of a sample.

BRIEF SUMMARY OF THE INVENTION

A mass spectrometer from the applicant, bearing the name Triton or Neptune, is provided with a multi-collector apparatus. Here, in a first arrangement, a plurality of ion detectors, some of which can be displaced, are kept in parallel next to one another. The displacement makes it possible to match the positions of the detectors to the mass positions of the expected ion beams. In general, interspaces as ion passages may be present between the detectors or these may be formed by displacing the detectors.

The detectors in the first arrangement have a relatively narrow design in the transverse direction to the ion beam, and so it is possible to cover correspondingly many mass positions. However, these types of detector are often not suitable for detecting very low count rates or they have a restricted dynamic range. By way of example, these are Faraday collectors, mini secondary electron multipliers or so-called Channeltrons. Combinations are also possible. Compared to these, standard secondary electron multipliers (SEM) require significantly more space, particularly in combination with an upstream energy barrier. By way of example, the latter is embodied as a retarding potential quadrupole (RPQ).

Ion beams of isotopes with very low count rates are preferably routed through an ion passage in the first arrangement and then reach an SEM in the second arrangement. Prior to this, the ion beams optionally pass through an energy barrier for masking ion beams made up of other masses, which reached the position of the SEM as a result of scattering. The energy barrier principle is explained in DE 40 02 849 A1 and EP 1 339 089 B1. Deflecting ion beams using deflectors has also been disclosed; cf. the mass spectrometers Triton and Neptune from the applicant.

It goes without saying that the ion detector costs depend on their number and type. The SEMs with upstream energy barriers in particular are relatively expensive compared to Faraday collectors. Therefore, it is expedient to use as few SEMs or, in general, as few detectors as possible, particularly in the second arrangement.

Moreover, installing a plurality of ion counting channels constitutes a spatial problem since the flexibility of the collector is greatly affected by installing the relatively large electron multiplier due to the large spatial requirement. As a result, it proves impossible to maintain the required minimum distances in the region of a few millimeters.

Increased flexibility of the instrument and, at the same time, improving the performance is what is desired; the latter in particular for measuring U and Pb.

The mass spectrometer according to the invention is characterized by a control for the at least one deflector such that ion beams of different isotopes (with various mass-to-charge ratios) can be routed to at least one ion detector in the second arrangement. Hence, the mass spectrometer or ion detector can be used for various applications.

The ion detector in the second arrangement is accordingly used for measuring different isotopes. This is achieved by, if required, routing an ion beam of a specific mass position to precisely this ion detector by deflection; this ion beam would not normally reach the ion detector in the second arrangement. Since the ion detector from the second arrangement is anyhow associated with a specific ion mass and, accordingly, a specific position, the deflection opens the possibility of detecting a further ion mass. As a result, it is possible to reduce the number of ion detectors in the second arrangement. In the most extreme case, only one ion detector is still present in the second arrangement. At the same time, n−1 deflectors are associated with the n possible ion passages in the first arrangement. The ion beam from an n-th ion passage arrives at the ion detector in the second arrangement without a deflector.

In addition to the moveable collectors (of different types) and the conventional counting channel with an energy barrier, further channels are made available, in which the respective ion beams are routed to the desired detector by deflection (e.g. by means of deflectors). In particular, this opens up the possibility of reaching the same detector from different positions in the image plane. By way of example, this can increase the flexibility in limited spatial conditions or minimize the number of particularly costly detectors. In the extreme case, it is possible to associate virtual measurement channels (i.e. positions in the image plane of the mass spectrometer) with any real collectors (Faraday detector, Channeltron, standard SEM, mini SEM).

The mass spectrometer according to the invention is used in particular for isotopic signature analysis in conjunction with heavy elements such as uranium, lead, plutonium, hafnium, thorium, lutetium, ytterbium, mercury. A further important application or part of the first-mentioned application is the dating of minerals such as zircons. Accordingly, isotopes of different elements, optionally in compounds as well, can be contained in a sample.

The mass spectrometer can have a single- or double focusing design. Provision is preferably made for a double-focusing mass spectrometer with a magnetic and an electric sector.

In principle there are no restrictions in respect of the possible ion sources. Use is preferably made of inductively coupled plasma (ICP), glow discharge (GD) or thermal ionization (TI) ion sources.

According to a further idea of the invention, provision is made for a plurality of ion detectors to be arranged in parallel next to one another along a row in the first arrangement, wherein at least one of the ion detectors can be displaced along the row. This allows targeted positioning of the ion detectors, either for collecting specific ion flows or for creating an ion passage—a gap—for an ion beam to pass through such that it can reach the region of the second arrangement. However, the ion detectors can also all be arranged in a stationary fashion.

According to a further idea of the invention, provision is made for a plurality of deflectors, more particularly in parallel next to one another. Advantageously, a plurality of deflectors are provided at a distance from one another both perpendicular to the ion beam and at a distance parallel to the ion beam. Accordingly, the deflectors are arranged diagonally offset with respect to one another, preferably for reasons of space or for once again deflecting ions, which are coming from a deflector, into an ion detector in the second arrangement. This can be advantageous for detectors that are only able to capture ion beams at a specific angle.

According to a further idea of the invention, provision is made for the deflectors to be energy barriers at the same time or for energy barriers to be associated with, more particularly arranged upstream of, the detectors. Ion-optical elements, such as ion lenses, deceleration electrodes or retarding potential quadrupoles (RPQs) can act as energy barriers.

According to a further idea of the invention, a third arrangement of ion detectors can be arranged downstream of the second arrangement of ion detectors. There are ion passages (gaps) in the first and the second arrangement or said passages should be formed by displacing detectors so that ion beams reach the detectors in the third arrangement. Additionally, provision may be made for one or more deflectors for deflecting ion beams coming from the first arrangement into suitable gaps in the second arrangement. Like the detectors in the first and/or second arrangement, the detectors in the third arrangement can preferably'also be displaceable along a row, more particularly parallel to the row of the detectors in the first arrangement.

The deflection preferably takes place within the plane spanned by the ion beams (trajectories). However, alternatively it is also possible to resort to the third dimension.

According to a further idea of the invention, Faraday collectors are exclusively or predominately provided as ion detectors in the first arrangement. These ion detectors are particularly narrow.

There advantageously is at least one Channeltron in the first arrangement. In conjunction with the Faraday collectors this affords better detection of different isotopes or masses.

There can also be at least one mini SEM (miniaturized secondary electron multiplier) in the first arrangement. This further improves the possibility of detecting different isotopes or masses.

According to a further idea of the invention there is at least one secondary electron multiplier in the second arrangement. Optionally this also holds true for the third arrangement. An energy barrier can be associated with or arranged upstream of the at least one secondary electron multiplier in the second or third arrangement. As a result, it is possible to screen incorrectly routed ions that have reduced energy before these enter the secondary electron multiplier.

The subject matter of the invention also includes a multicollector arrangement for use in an isotope mass spectrometer.

The subject matter of the invention also includes the uses specified in the claims.

The method according to the invention for analyzing isotopes in a sample with a single- or double-focusing mass spectrometer, a first arrangement of ion detectors and ion passages and a second arrangement of ion detectors and with at least one deflector, is characterized in that during a measurement at least one isotope from the sample passes an ion passage of the first arrangement and is detected by a specific ion detector in the second arrangement, and in that during a further measurement at least one other isotope from the same sample passes an ion passage of the first arrangement and, as a result of deflection, is routed to the same specific ion detector (in the second arrangement) as in the other measurement. A converse sequence is also possible, namely firstly the measurement of an isotope with deflection before arriving at the detector of the second arrangement and subsequently measuring another isotope with the same ion detector in the second arrangement but without a preceding deflection. The illustrated method allows a multiple use of ion detectors in the second arrangement for isotopes from the same sample, particularly in measurements that directly follow one another.

Ion beams can advantageously cross one another between the first and the second arrangement during a measurement. The hit cross section of the ions to be taken into account is so small that a collision can be virtually ruled out.

Further features of the invention moreover emerge from the description and from the claims.

BRIEF DESCRIPTION OF THE DRAWINGS

Advantageous embodiments of the invention will be explained in more detail below on the basis of the drawings, in which.

DETAILED DESCRIPTION OF PREFERRED EMBODIMENTS

Figure 1:
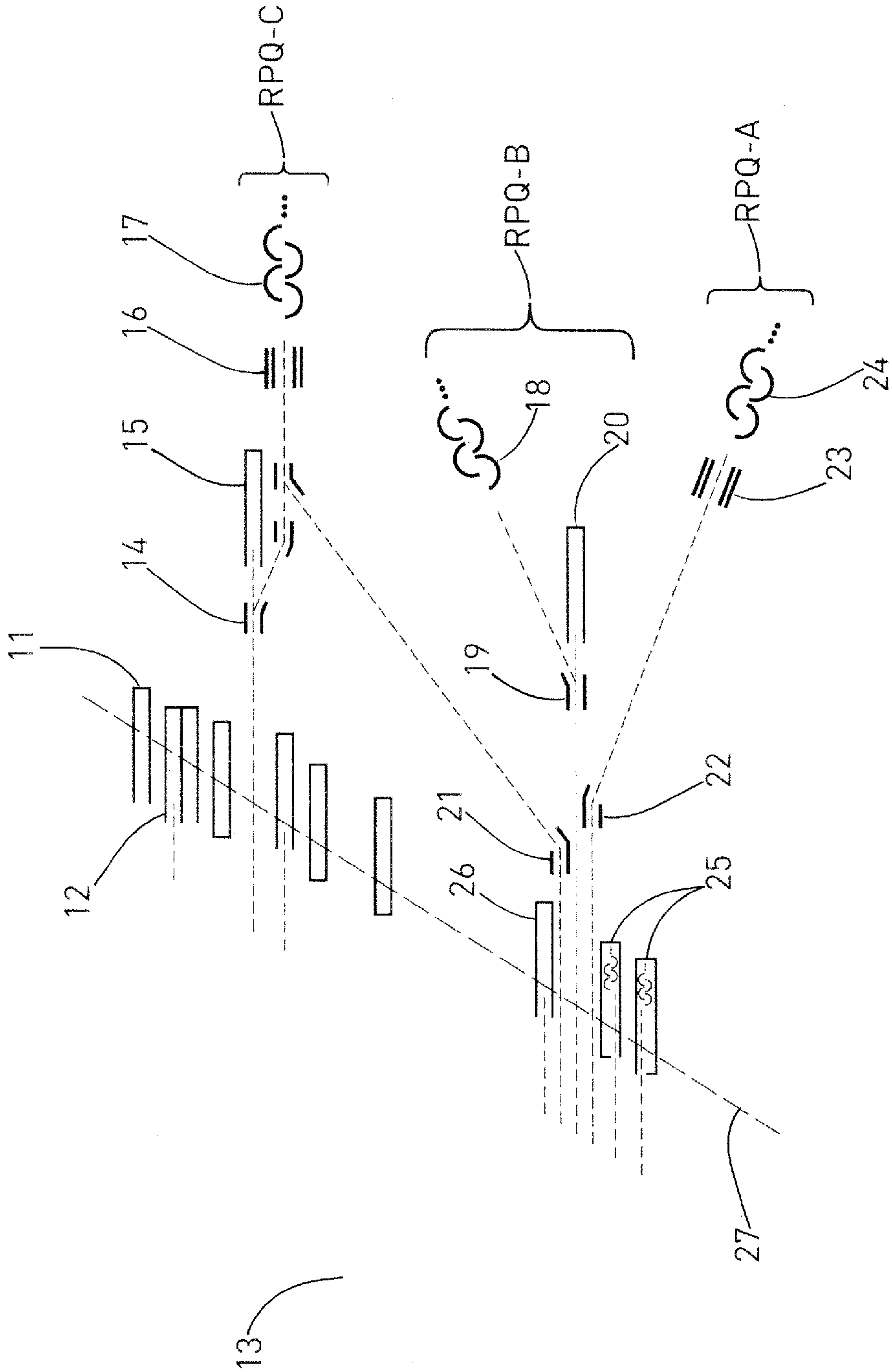
FIG. 1 shows a first multi-collector arrangement, more particularly in a mass spectrometer according to the invention.

Firstly in respect of FIG. 1:

A single- or double-focusing mass spectrometer with a multi-collector arrangement is augmented by additional measurement channels. In the process, ion beams passing an image plane are deflected into the desired position by deflectors.

By way of example, a deflector 21 guides an ion beam onto a main channel with energy barrier 16/17. A further ion beam can optionally be routed to a Faraday collector 20 or an SEM 18 by means of a deflector 19. A neighboring ion beam is deflected to a further SEM 24 with energy barrier 23 by means of a deflector 22. Further moveable collectors can optionally be positioned in an image plane 27, for example a Faraday collector 26 or, optionally, asymmetrically designed miniature SEMs 25. Asymmetric (mini) SEMs have their inlet opening on the edge and can be inserted into the first arrangement in this fashion, e.g. in the outer region of the arrangement and with the inlet openings next to one another or if only signals with a spacing of two or more mass units are of interest.

The design in FIG. 1 can for example serve to augment a universal mass spectrometer combination by specific detection options that are optimized for uranium.

In the case of enriched uranium, the mass numbers 235 and 238 dominate. The tails of these peaks can interfere with the measurements on the neighboring channels (see tables for tails of U238). This can be prevented by an energy barrier.

A further application is the dating of zircon. In the process, the interest lies in measuring different isotopes of U, Th, Hf, Lu, Yb, Pb and Hg. The design in FIG. 1 first of all allows simultaneous measurement of the elements U, Th, Pb and Hg, followed by the elements Hf, Lu and Yb. In the process, the detector "RPQ C" is used in both measurements, but is targeted from different positions in the image plane 27.

The detectors are selected in accordance with the signal intensities and expected interference. Two further SEMs 25 are still inserted into the image plane in addition to the collectors situated behind the image plane 27—i.e. measurement channel RPQ-C with Faraday collector 15 and SEM 17 with energy barrier 16 (retarding potential), channel RPQ-A with SEM 24 with energy barrier 23, and RPQ-B with SEM 18 and Faraday 20. Since directly adjacent mass numbers are not always of interest (e.g. not "203"), there often is no problem if an "inline" SEM has double the width of a mass spacing in the image plane.

Figure 2:
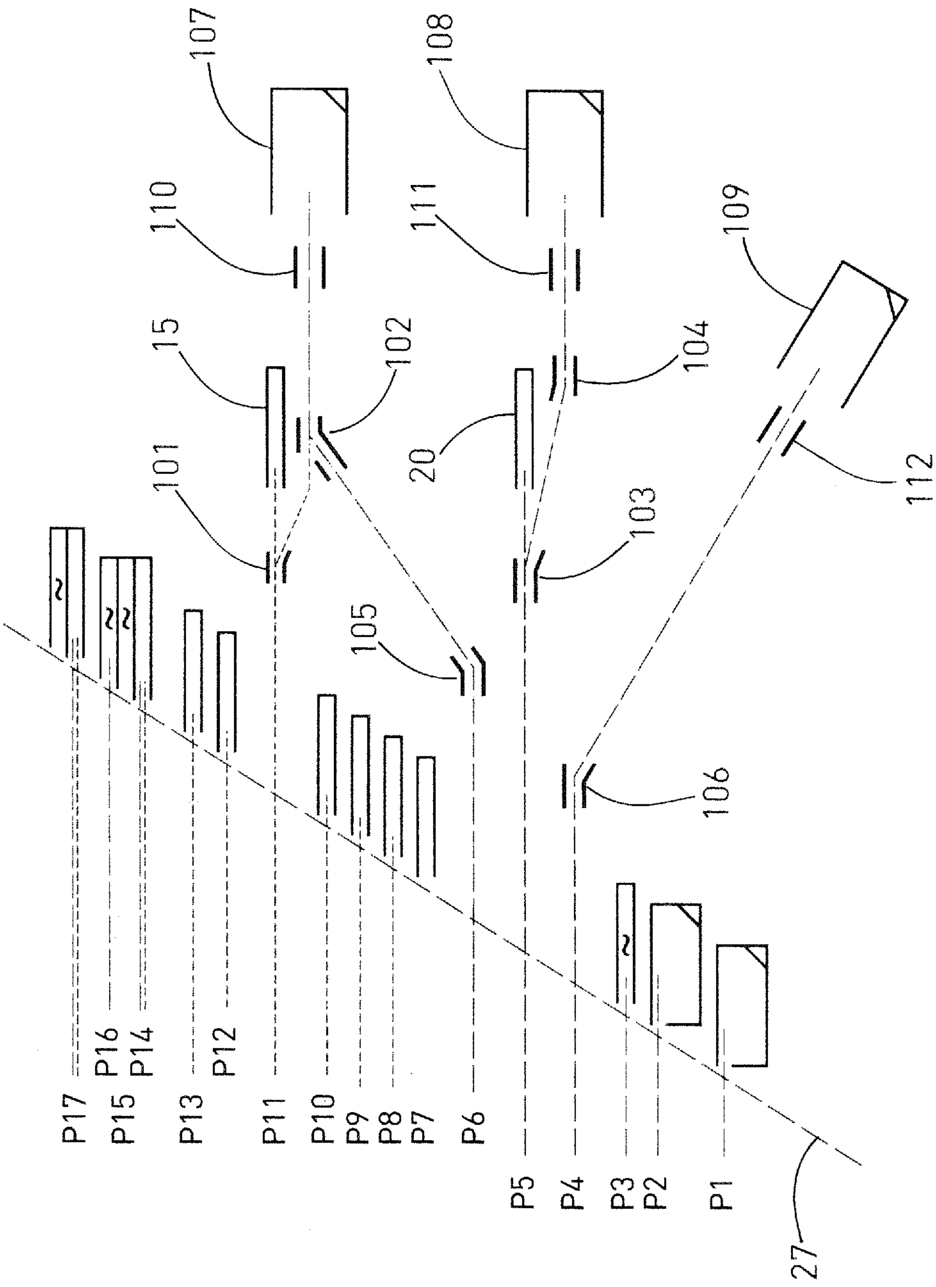
FIG. 2 shows a second multi-collector arrangement.

FIG. 2: Configuration in respect of Tables 1 and 2.

SEM drawn as collector with a triangle in the corner;

Faraday drawn as "pocket";

Channeltron as pocket with "tilde";

Deceleration lens indicated by parallel lines.

The individual passages P1 to P17 lead to different detectors (see tables).

The measurements in the two rows of Table 2 (upper row: long dashes in the drawing; lower row: short dashes in the drawing) are carried out either one after another or alternately for a sample. Some of the collectors may, if need be, be displaced between the measurements.

In this case the passages are moveable and more of a logical concept than a physical one. In principle, in order to bring ions from the primary detection surface into the rear zone, a free or field-free space suffices; however, there may also be defining apertures and further ion-optical elements at said location. These may be moveable or stationary.

The detector assignment follows the relative intensities of the isotopes. Here the deflectors 101 through 106 serve to deflect the ion beams. More particularly, the deflectors 101, 102 and 105 allow the channel "RPQ-C" with SEM 107 and deceleration lens 110 to be reached both by passage P11 and passage P6. The detectors are beam switches at the same time.

Compared to the Channeltrons, the SEMs are distinguished by a greater dynamic range; the Channeltrons are smaller and can be arranged without problems behind or next to passages at a distance of one mass number.

In the example in Table 2, the mass 175Lu is measured on the central channel RPQ-C. Lu interferes with 176Hf, and needs to be determined precisely so that the ratio 176Hf/177Hf is determined correctly. The latter is the ratio that is of geological interest.

The Lu concentration is generally significantly lower than the Hf concentration and therefore it is important to measure this contamination using the ion counter.

The same instrument can be used without problems to measure samples from further applications, e.g. 90Sr, 88Sr, 87Sr, 86Sr, 84Sr for medical and geological examinations and 210Pb, 208Pb, 207Pb, 206Pb, 204Pb for determining the age of samples.

Figure 3:
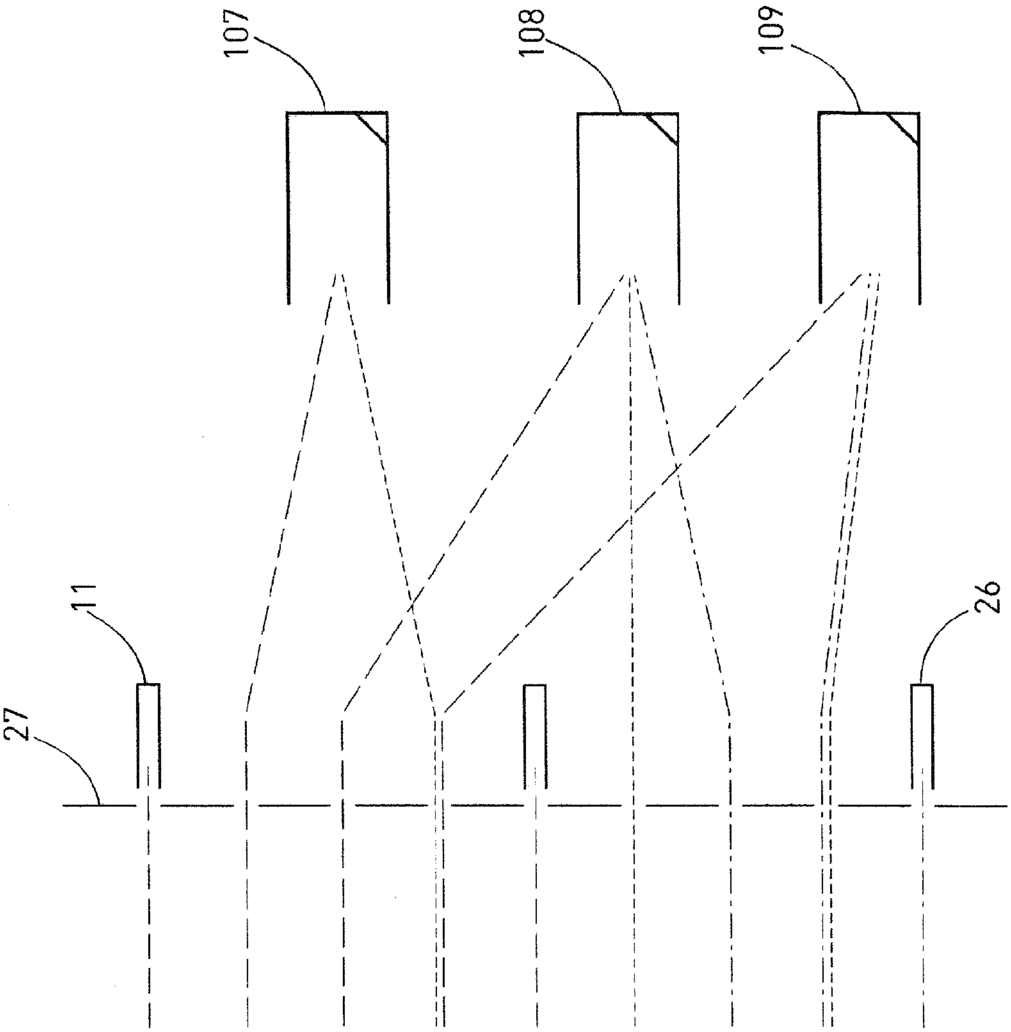
FIG. 3 shows a third multi-collector arrangement.

FIG. 3 shows a configuration with fixed slits, preferably in the region of the image plane 27, namely a hypothetical configuration for three measurement situations illustrated by different types of line (------, _•_•_•_•, ________), in which the rear detectors 107, 108, 109 are assigned in a variable fashion. The deflectors and optional energy filters or barriers have not been illustrated for reasons of clarity.

Variable magnification (e.g. a "zoom lens") allows efficient operation of the detector system, even in the case of constant passages. The mass spacing can optionally be varied such that only every second passage (or less) is associated with a mass.

The Faraday detectors can optionally be moveable, and so they can be moved e.g. behind any passage (and, in particular, passages can also be released).

Figure 4:
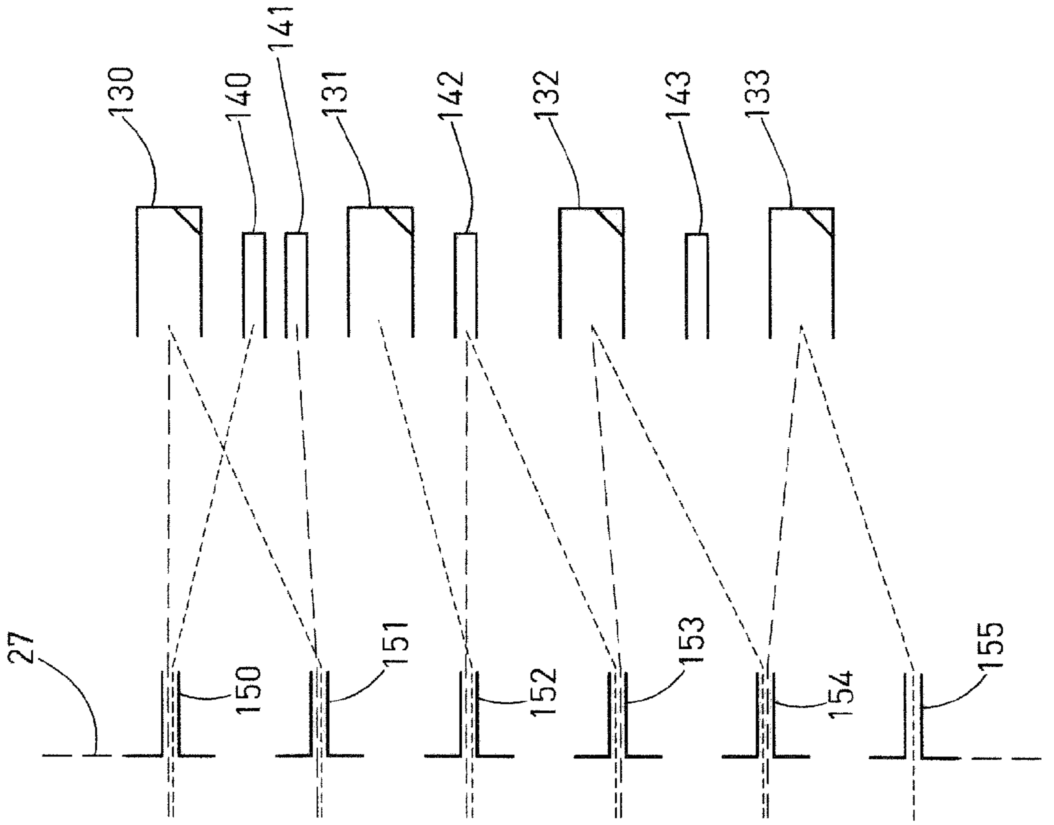
FIG. 4 shows a fourth multi-collector arrangement.

FIG. 4 shows a configuration in which all detectors—SEMs 130 to 133 and Faraday collectors 140 to 143—are arranged behind the focal/image plane 27. Only (optionally moveable) passages with deflectors 150-155 are situated in the image plane 27. The deflectors route the ion beams to the desired detectors. In principle, the ion beams can also cross here because—at least at moderate beam intensities—the ions barely influence one another.

The multiple use of the center RPQ (with beam switch 102) allows an instrument to measure virtually any application in an optimum fashion, without requiring alterations.

Notes to Table 1:

*1:

*2: U500: Enriched uranium with 50% 235U.

*3: Specifies the percentage of the U238 signal (or U235 signal) present in the respective channel as interference. This interference is suppressed virtually completely by the RPQ.

*4: Channels 7 to 15 can be used as desired for other measurements.

*5: Channel 11 is more particularly also used for alternately measuring different masses (peak jumping). Here, it is particularly advantageous for SEMs with energy filters and Faraday collectors to be available behind a passage.

*6: The interference of 1 ppm means that the signal in positions 236 and 234 can be falsified by a few percent in the case of slightly to moderately enriched uranium.

Notes to Table 2:

Abbreviations:

Ch: Channeltron

F: Faraday collector

RPQ: Retarding potential quadrupole (=secondary electron multiplier [SEM] with an upstream energy barrier, i.e. a "deceleration lens").

SEM: Secondary electron multiplier

22 Deflector
23 Energy barrier
24 SEM
25 Mini SEM
26 Faraday
27 Image plane
101-106 Deflectors
107-109 SEMs
110-112 Deceleration lenses
130-133 SEMs
140-143 Faraday collectors
150-155 Deflectors
P1-P17 Passages or positions
RPQ-A, RPQ-B, RPQ-C Measurement channels

What is claimed is:

1. A mass spectrometer for analyzing isotopic signatures, comprising:

at least one magnetic analyzer;

an optional electric analyzer;

a first arrangement with ion passages or with ion passages and at least one ion detector;

a second arrangement with at least one ion detector including a selected ion detector, the second arrangement being arranged downstream of the first arrangement in the direction of an ion beam;

at least one deflector in the region of the two arrangements or between the first arrangement and the second arrangement; and a control for the at least one deflector such that some ion beams of different isotopes with various mass-to-charge ratios, namely some ion beams of different ion passages in the first arrangement, are routed to the selected ion detector (17, 107) in the second arrangement.

2. The mass spectrometer as claimed in claim 1, further comprising a plurality of ion detectors arranged in parallel next to one another along a row in the first arrangement,

TABLE 1

| | A | B | C | D | E | F | G | H | I |
|---|---|---|---|---|---|---|---|---|---|
| 1 | | | | | | | | | |
| 2 | Position # | P12 . . . 15 | P11 | P8 . . . 10 | P7 | P6 | P5 | P4 | P3 |
| 3 | Detector | F Chan. | SEM-RPQ-C/F | F | SEM/F | SEM-RPQ-C | SEM/F | SEM-RPQ-A | SEM |
| 4 | Passage type | (Movable) | (Passage) | (Movable) | (Movable) | (Passage) | (Passage) | (Passage) | (Fixed) |
| 5 | E.g. uranium | | | | | | | | |
| 6 | Isotope | | | | 238 | 236 | 235 | 234 | 233 |
| 7 | Natural abundance | | | | 99.270% | 0.000% | 0.720% | 0.006% | 0.000% |
| 8 | Slightly enriched | | | | 98.984% | 0.007% | 1.004% | 0.005% | 0.000% |
| 9 | Highly enriched *2 | | | | 49.711% | 0.076% | 49.969% | 0.518% | 0.010% |
| 10 | Sidebands of 238 *3 | | | | — | 1 ppm *6 | 0.7 ppm | 0.5 ppm | 0.3 ppm |
| 11 | Sidebands of 235 *3 | | | | | 1 ppm | — | 1 ppm | |
| 12 | Pu mass allocation | | | | 244 Pu | 241 Pu | 240 Pu | 239 Pu | 238 Pu |
| 13 | Other use *4 | Any | Any | Any | | | | | |
| 14 | Other use *5 | | peak jumping | | | | | | |

TABLE 2

| RPQ-C | | | | | | | | | | | SEM | | | | new | new |
|---|---|---|---|---|---|---|---|---|---|---|---|---|---|---|---|---|
| F | Ch | Ch | F | F | F | F | F | F | F | F | RPQ-C | F | RPQ-A | Ch | SEM | SEM |
| 238 | 235 | — | 232 | — | — | — | — | — | — | — | 208 | 207 | 206 | 205 | 204 | 202 |
| U | U | | Th | | | | | | | | Pb | Pb | Pb | Pb | Pb | Hg |
| 179 | — | — | 178 | 177 | 176 | 175 | 174 | 173 | 171 | — | | | | | | |
| Hf | | | Hf | Hf | Hf | Lu | Hf | Yb | Yb | | | | | | | |
| P17 | P16 | P15 | P14 | P13 | P12 | P11 | P10 | P9 | P8 | P7 | P6 | P5 | P4 | P3 | P2 | P1 |

LIST OF REFERENCE SIGNS

11 Moveable (Faraday) collector
12 Moveable detector combination (Faraday+Channeltron)
13 From the ion source
14 Deflector
15 Faraday collector
16 Energy barrier
17 Secondary electron multiplier collector (SEM)
18 SEM
19 Deflector
20 Faraday
21 Deflector wherein the ion detectors are arranged in a stationary fashion or at least one of the ion detectors is displaceable along the row.

3. The mass spectrometer as claimed in claim 1, further comprising a plurality of deflectors in parallel next to one another.

4. The mass spectrometer as claimed in claim 1, further comprising a plurality of deflectors provided at a distance from one another both perpendicular to the ion beam and parallel to the ion beam.

5. The mass spectrometer as claimed in any one of claims 1-4, wherein the deflectors are energy barriers at the same time or energy barriers are associated with the detectors.

6. The mass spectrometer as claimed in any one of claims 1-4, further comprising a third arrangement with at least one ion detector arranged downstream of the second arrangement.

7. The mass spectrometer as claimed in claim 6, further comprising at least one SEM in the third arrangement.

8. The mass spectrometer as claimed in claim 6, further comprising an energy barrier or an energy filter associated with at least one SEM in the second arrangement or the third arrangement.

9. The mass spectrometer as claimed in claim 1, wherein Faraday collectors are exclusively or predominately provided as ion detectors in the first arrangement.

10. The mass spectrometer as claimed in claim 1, further comprising at least one Channeltron in the first arrangement.

11. The mass spectrometer as claimed in claim 1, further comprising at least one mini SEM in the first arrangement.

12. The mass spectrometer as claimed in claim 1, further comprising at least one secondary electron multiplier (SEM 17, 107) in the second arrangement, for detecting the ion beams of different isotopes and different beam positions.

13. The mass spectrometer as claimed in claim 1, further comprising at least one ion-optical elements provided in addition to the at least one deflector.

14. The mass spectrometer as claimed in claim 1, wherein at least one of the detectors is moveable.

15. The mass spectrometer as claimed in claim 1, further comprising ion-optical elements provided as beam switches (101, 102, 103), for selectively deflecting or routing ion beams in the direction of selected detectors, with the option of splitting an ion beam and directing partial beams to at least two of the detectors, which have different designs.

16. The mass spectrometer as claimed in claim 1, further comprising, in the region of the first arrangement, at least one asymmetrical SEM (25) with an edge-side inlet opening.

17. The use of the mass spectrometer as claimed in claim 1, for analyzing zircons.

18. The use of the mass spectrometer as claimed in claim 1, for measuring the isotopic signature of uranium.

19. The use of the mass spectrometer as claimed in claim 1, for measuring the isotopic signature of plutonium.

20. The use of the mass spectrometer as claimed in claim 1, for analyzing the content of uranium, lead, and hafnium in a sample.

21. The mass spectrometer as claimed in claim 1, wherein at least one of the ion passages is moveable.

22. A mass spectrometer for analyzing isotopic signatures, comprising:

at least one magnetic analyzer;

an optional electric analyzer;

a first arrangement with ion passages or with ion passages and at least one ion detector;

a second arrangement with at least one ion detector including a selected ion detector, the second arrangement being arranged downstream of the first arrangement in the direction of an ion beam;

at least one ion-optical element at least in the region of the two arrangements or between the first arrangement and the second arrangement; and a control for the at least one ion-optical element such that some ion beams of different isotopes with various mass-to-charge ratios, namely some ion beams of different ion passages in the first arrangement, are routed to the selected ion detector (17, 107) in the second arrangement.

23. A method for analyzing isotopic signatures, comprising the steps of:

a) providing isotopes;

b) providing a mass spectrometer comprising:

at least one magnetic analyzer;

an optional electric analyzer;

a first arrangement with ion passages or with ion passages and at least one ion detector;

a second arrangement with at least one ion detector including a selected ion detector, the second arrangement being arranged downstream of the first arrangement in the direction of an ion beam;

at least one deflector in the region of the first arrangement and the second arrangement or between the first arrangement and the second arrangement; and a control for the at least one deflector such that some ion beams of different isotopes with various mass-to-charge ratios, namely some ion beams of different ion passages in the first arrangement are routed to the selected ion detector (17, 107) in the second arrangement; and c) analyzing the isotopes in the mass spectrometer.

24. The method for analyzing isotopic signatures as claimed in claim 23, wherein the mass spectrometer further comprises a plurality of ion detectors arranged in parallel next to one another along a row in the first arrangement, wherein the ion detectors are arranged in a stationary fashion or at least one of the ion detectors is displaceable along the row.

25. The method for analyzing isotopic signatures as claimed in claim 23, wherein the mass spectrometer further comprises a plurality of deflectors in parallel next to one another.

26. The method for analyzing isotopic signatures as claimed in claim 23, wherein the mass spectrometer further comprises a plurality of deflectors provided at a distance from one another both perpendicular to the ion beam and parallel to the ion beam.

27. The method for analyzing isotopic signatures as claimed in claim 23, wherein the at least one deflector is an energy barrier at the same time or energy barriers are associated with the detectors.

28. The method for analyzing isotopic signatures as claimed in claim 23, wherein the mass spectrometer further comprises a third arrangement with at least one ion detector arranged downstream of the second arrangement.

29. The method for analyzing isotopic signatures as claimed in claim 28, wherein the mass spectrometer further comprises at least one SEM in the third arrangement.

30. The method for analyzing isotopic signatures as claimed in claim 28, wherein the mass spectrometer further comprises an energy barrier or an energy filter associated with at least one SEM in the second arrangement or the third arrangement.

31. The method for analyzing isotopic signatures as claimed in claim 23, wherein the mass spectrometer further comprises Faraday collectors that are exclusively or predominately provided as ion detectors in the first arrangement.

32. The method for analyzing isotopic signatures as claimed in claim 23, wherein the mass spectrometer further comprises at least one Channeltron in the first arrangement.

33. The method for analyzing isotopic signatures as claimed in claim 23, wherein the mass spectrometer further comprises at least one mini SEM in the first arrangement.

34. The method for analyzing isotopic signatures as claimed in claim 23, wherein the mass spectrometer further comprises at least one secondary electron multiplier (SEM 17, 107) in the second arrangement, for detecting the ion beams of different isotopes and different beam positions.

35. The method for analyzing isotopic signatures as claimed in claim 23, wherein the mass spectrometer further comprises at least one ion-optical element provided in addition to the at least one deflector.

36. The method for analyzing isotopic signatures as claimed in claim 23, wherein at least one of the detectors of the mass spectrometer is moveable.

37. The method for analyzing isotopic signatures as claimed in claim 23, wherein the mass spectrometer further comprises ion-optical elements provided as beam switches (101, 102, 103), for selectively deflecting or routing ion beams in the direction of selected detectors, with the option of splitting an ion beam and directing partial beams to at least two of the detectors, which have different designs.

38. The method for analyzing isotopic signatures as claimed in claim 23, wherein the mass spectrometer further comprises, in the region of the first arrangement, at least one asymmetrical SEM (25) with an edge-side inlet opening.

39. The method for analyzing isotopic signatures as claimed in claim 23, wherein at least one of the ion passages is moveable.

40. A method for analyzing isotopic signatures, comprising the steps of:

a) providing isotopes;

b) providing a mass spectrometer comprising:

at least one magnetic analyzer;

an optional electric analyzer;

a first arrangement with ion passages or with ion passages and at least one ion detector;

a second arrangement with at least one ion detector including a selected ion detector, the second arrangement being arranged downstream of the first arrangement in the direction of an ion beam;

at least one ion-optical element in the region of the first arrangement and the second arrangement or between the first arrangement and the second arrangement; and a control for the at least one ion-optical element such that some ion beams of different isotopes with various mass-to-charge ratios, namely some ion beams of different ion passages in the first arrangement are routed to the selected ion detector (17, 107) in the second arrangement; and c) analyzing the isotopes in the mass spectrometer.

41. A method for analyzing isotopic signatures, comprising the steps of:

a) providing isotopes;

b) providing a mass spectrometer comprising:

at least one magnetic analyzer, an optional electric analyzer, a first set consisting of ion passages, at least one ion detectors, or a combination of ion passages and ion detectors, a second set of at least one detector including a selected detector, at least one deflection element comprising at least one electrode;

c) operating said deflection element such that in a first mode of operation ions from a first ion passage of the first set reach said selected detector of the second set;

d) further operating said deflection element such that in a second mode of operation ions from a second ion passage of the first set reach said selected detector of the second set.

42. The method for analyzing isotopic signatures as claimed in claim 41, wherein at least one of the ion passages is moveable.

43. A mass spectrometer for analyzing isotopic signatures, comprising:

at least one magnetic analyzer, an optional electric analyzer, a first set consisting of ion passages, at least one ion detectors, or a combination of ion passages and ion detectors, a second set of at least one detector including a selected detector, at least one deflection element comprising at least one electrode, wherein in a first mode of operation of the at least one deflection element ions from a first ion passage of the first set reach said selected detector of the second set, and in a second mode of operation of the at least one deflection element ions from a second ion passage of the first set reach said selected detector of the second set.

44. The mass spectrometer as claimed in claim 43, wherein at least one of the ion passages is moveable.

* * * * *